United States Patent
Nath et al.

(10) Patent No.: US 9,021,005 B2
(45) Date of Patent: Apr. 28, 2015

(54) SYSTEM AND METHOD TO PROVIDE REMOTE DEVICE MANAGEMENT FOR MOBILE VIRTUALIZED PLATFORMS

(75) Inventors: Badri Nath, Edison, NJ (US); Rakesh Kushwaha, Marlboro, NJ (US)

(73) Assignee: Mformation Software Technologies LLC, Woodbridge, NJ (US)

( * ) Notice: Subject to any disclaimer, the term of this patent is extended or adjusted under 35 U.S.C. 154(b) by 0 days.

(21) Appl. No.: 13/286,607

(22) Filed: Nov. 1, 2011

(65) Prior Publication Data

US 2012/0226740 A1    Sep. 6, 2012

Related U.S. Application Data

(60) Provisional application No. 61/449,288, filed on Mar. 4, 2011.

(51) Int. Cl.
| | |
|---|---|
| *H04W 8/22* | (2009.01) |
| *H04L 29/08* | (2006.01) |
| *H04W 4/00* | (2009.01) |
| *H04L 12/24* | (2006.01) |
| *G06F 9/455* | (2006.01) |

(52) U.S. Cl.
CPC .............. *H04L 67/125* (2013.01); *H04W 4/001* (2013.01); *H04L 41/082* (2013.01); *H04L 41/0856* (2013.01); *G06F 9/45558* (2013.01); *G06F 2009/45579* (2013.01)

(58) Field of Classification Search
CPC . H04L 41/0893; H04L 63/0272; H04L 67/04; H04L 67/10; H04W 4/001; H04W 8/22
USPC .......................................... 709/203, 223, 224
See application file for complete search history.

(56) References Cited

U.S. PATENT DOCUMENTS

| | | | | |
|---|---|---|---|---|
| 7,870,153 | B2 * | 1/2011 | Croft et al. ..................... | 707/781 |
| 7,937,071 | B2 * | 5/2011 | Lee ............................... | 455/411 |
| 8,060,074 | B2 * | 11/2011 | Danford et al. ............... | 455/419 |
| 2009/0036111 | A1 | 2/2009 | Danford et al. | |

(Continued)

OTHER PUBLICATIONS

Korean Intellectual Property Office (as International Searching Authority), International Search Report and Written Opinion of the International Searching Authority, International Patent Application No. PCT/US2012/026431, mailed Oct. 16, 2012.

(Continued)

*Primary Examiner* — Douglas W Owens
*Assistant Examiner* — Monica C King
(74) *Attorney, Agent, or Firm* — Brosemer, Kolefas & Associates LLC (57) ABSTRACT

A virtualization aware device management (VADM) server manages mobile devices, including mobile devices that have been virtualized. Each virtualized mobile device supports multiple virtual devices. Each virtual device can be managed independently by the VADM server, in similar manner to non-virtualized devices. The VADM server interacts with one or more device management clients (DMCs) running on a virtualized mobile device to manage the virtual devices installed thereon. In a mobile virtualized device, a DMC can run exclusively within the virtual machine monitor (VMM) for remote management of some or all of the virtual devices on the mobile virtualized device; within each virtual device for remote management of the respective virtual device; or a combination thereof, with a DMC in the VMM acting as a bridge for DMCs within the virtual devices.

15 Claims, 5 Drawing Sheets

(56) References Cited

U.S. PATENT DOCUMENTS

| | | | |
|---|---|---|---|
| 2009/0199176 A1* | 8/2009 | Nath et al. | 717/178 |
| 2010/0192170 A1 | 7/2010 | Raleigh | |
| 2010/0211941 A1 | 8/2010 | Roseborough | |
| 2010/0223134 A1 | 9/2010 | Lunenfeld | |
| 2010/0325191 A1* | 12/2010 | Jung et al. | 709/202 |
| 2010/0332635 A1* | 12/2010 | Rogel et al. | 709/223 |
| 2012/0015644 A1* | 1/2012 | Danford et al. | 455/419 |
| 2012/0036178 A1* | 2/2012 | Gavini et al. | 709/203 |
| 2012/0254762 A1* | 10/2012 | Parmar et al. | 715/736 |

OTHER PUBLICATIONS

European Patent Office, Extended Search Report, European Application No. 12755382.4, Jul. 14, 2014.

* cited by examiner

SYSTEM AND METHOD TO PROVIDE REMOTE DEVICE MANAGEMENT FOR MOBILE VIRTUALIZED PLATFORMS

RELATED PATENT APPLICATIONS

The present application claims priority from U.S. Provisional Patent Application No. 61/449,288, filed on Mar. 4, 2011, which is incorporated herein by reference in its entirety.

FIELD OF INVENTION

The present invention relates to systems and methods of providing remote device management of wireless devices that support virtualization.

BACKGROUND INFORMATION

Figure 1:
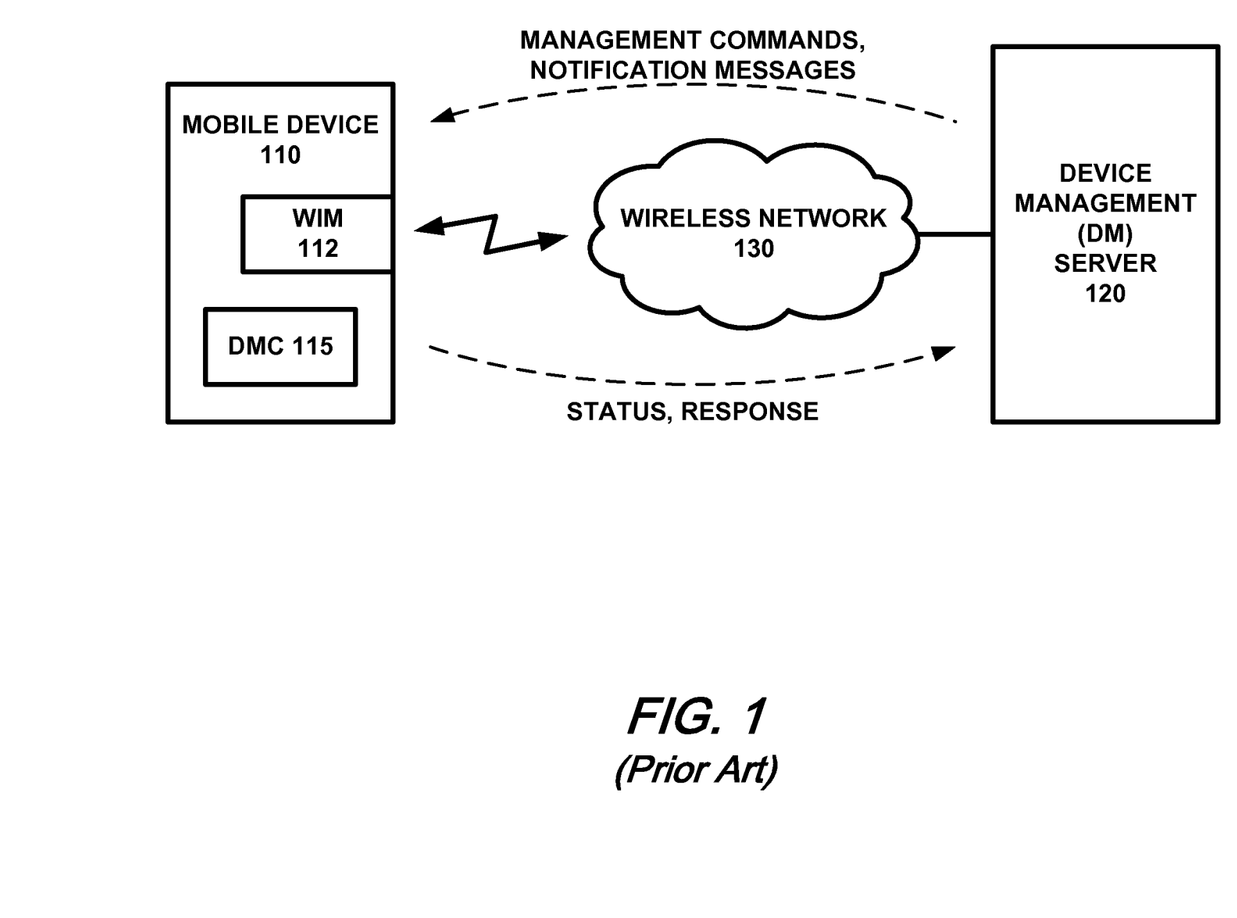
FIG. 1 is a high-level block diagram of an illustrative system in which a mobile device and a device management (DM) server interact.

A non-virtualized wireless device typically supports one operating environment and one device management client that interacts with a device management (DM) server to provide device management functionality. Such an interaction is illustrated in FIG. 1. With a non-virtualized device 110, a single device management client (DMC) 115 interacts with a DM server 120. As there is only one operating environment executing in such a device, DMC 115 carries out management tasks related to all components of the device that are to be managed. Typical components of a mobile wireless device that can be managed remotely include hardware components such as wireless network interfaces and input/output components; firmware; and application software that executes on the device. Management functions relating to hardware components may include, for example, configuration, diagnostics and control. Software and firmware management may include remote installation of application software as well as supervisory software and firmware, such as software for implementing DMC 115, among others.

Existing remote wireless DM servers manage non-virtualized devices, which support single operating systems. With a non-virtualized device, there is a one-to-one mapping between the device and a device identifier that the DM server associates with the device. The device identifier may be, for example, the device's International Mobile Equipment Identity (IMEI), Electronic Serial Number (ESN), Mobile Equipment Identifier (MEID), Globally Unique Identifier (GUID), Serial Number, Stock Keeping Unit (SKU), or any identifier or combination thereof that uniquely identifies a hardware platform. Typically, during each transaction between a device and a DM server, the device identifier is exchanged between the device and the server so that credentials, which are typically indexed based on the device identifier, can be checked with respect to the device. In addition, a routing identifier—such as a Mobile Subscriber Integrated Services Digital Network (MSISDN) number, Media Access Control (MAC) address, or Internet Protocol (IP) address—is typically associated with the device so that a DM server can send messages to the device using the routing identifier.

A virtualized device is a device that supports multiple virtual environments. Each virtual environment or operating system that is installed on the device is an instance of an operating system. Typically, with a virtualized device, there is more than one instance of an operating system executing on the same device. Monitoring software, termed the virtual machine monitor (VMM) or hypervisor executes on the hardware and multiplexes multiple operating systems so that hardware resources, such as CPU, memory and I/O resources, can be shared among the virtual environments. At the same time, the multiple operating systems offer isolation for applications that execute within each virtual environment. Each virtual environment that multiplexes the underlying hardware resources is generally referred to as a virtual machine or virtual device.

Because multiple virtual devices requiring remote management can exist on a virtualized device, it is not possible for a conventional DM server which is limited to interacting with only the underlying platform device to manage multiple virtual devices individually. A need exists, therefore, for methods and apparatus allowing remote device management of each of the multiple virtual devices supported by a mobile virtualized platform.

SUMMARY

In exemplary embodiments, the present invention provides methods and apparatus for managing virtual environments or virtual devices on mobile virtualized devices.

In exemplary embodiments, the present invention provides a virtualization aware device management (VADM) server that identifies the different virtual devices on a mobile virtualized device and interacts with a device management client executing in each of the virtual devices. The VADM server automatically associates a management command with a given virtual environment and embeds in the command an identifier associated with the virtual environment so that management commands are directed to the device management client for that virtual environment. When the mobile virtualized device is registered at the VADM server, the server notes that the device is virtualized and creates as many entries in a device table as there are virtual environments installed on the virtualized device. Using a unique identifier associated with each virtual environment, the VADM server sends the command to the appropriate device management client on the virtualized device. The device management client will then execute the command.

In exemplary embodiments, the VADM server interacts with a device management client executing in a virtual machine monitor (VMM) of a virtualized device. In such embodiments, the device management client handles management communications for the multiple virtual devices supported on the virtualized device and executes commands for a virtual device within the context of the virtual device. In exemplary embodiments, in addition to a device management client in the VMM, one or more virtual devices has its own device management client.

An aspect of an exemplary embodiment is directed to representing multiple virtual devices existing on the same mobile virtualized device. An exemplary method includes deriving the identifier of a virtual device as a combination of a unique identifier associated with the underlying mobile device hardware and an extension identifier that is locally unique within the mobile device. The derivation of the identifier can be accomplished by each device management client within the virtual devices or by the device management client within the VMM when individual operating systems register at boot time.

Another aspect of an exemplary embodiment involves representing and maintaining, at a VADM server, the virtualization status of a mobile device. By firmware updates or the like, a non-virtualized mobile device can become virtualized, or a virtualized mobile device can become non-virtualized. Additionally, virtual devices can be installed or uninstalled on a virtualized mobile device. An exemplary VADM server tracks such changes in the virtualization status of a mobile device.

Yet another aspect of an exemplary embodiment is directed to a VADM server that is capable of managing both virtualized and non-virtualized devices.

Yet another aspect of an exemplary embodiment is directed to a mobile virtualized device that can support a single management client executing on the monitor software, multiple management clients executing in each virtual environment, or a combination thereof.

DETAILED DESCRIPTION

FIG. 1 is a high-level block diagram of an illustrative system in which a conventional, non-virtualized mobile device 110 and a device management (DM) server 120 interact via a wireless network 130. Mobile device 110 may include, for example, a cellphone, smartphone, tablet, PDA, laptop or any other device that is capable of communicating via a wireless interface. Typically, mobile device 110 has a wireless interface module (WIM) 112 that can wirelessly connect to wireless network 130 using any one or more wireless bearers such as GPRS, WLAN, WIMAX, EVDO, LTE, and mobile broadband, among others. Mobile device 110 may have multiple wireless interfaces allowing for communication using any combination of the available wireless interfaces. DM server 120 may interconnect to wireless network 130 over any suitable wired or wireless connection or connections.

As a non non-virtualized device, mobile device 110 supports a single operating system environment with a single device management client (DMC) 115 for interacting with DM server 120. For remote management purposes it is assumed that DMC 115 is capable of interacting with DM server 120, including executing management commands and responding to notification messages received from DM server 120. In a typical interaction, DM server 120 sends a management command to mobile device 110 that is executed by DMC 115. DMC 115 will then typically send a response back to the DM server that may include, for example, the results and/or execution status of the management command. Examples of management commands may include, but are not limited to configuring a password for accessing a wireless network, installing applications, configuring applications, providing remote backup of data, and performing lock and/or wipe operations, among others. In a further typical interaction, DM server 120 may send to mobile device 110 a notification message, which notifies the device that one or more management commands for the device have been queued by DM server 120. In response, DMC 115 of mobile device 110 initiates a connection to DM server 120 to obtain the management command(s) queued for the device. In some instances, DMC 115 of mobile device 110 may also initiate a connection to DM server 120 without first receiving a notification message.

In a typical implementation, DM server 120 includes a management software module that operates in accordance with a device management protocol to remotely manage wireless devices; a device database; and an interface for interfacing the server to network 130 in order to communicate with devices such as mobile device 110.

In a mobile virtualized device that supports remote device management, multiple virtual environments requiring management simultaneously exist on the same device. For example, in the case of software component management, various applications can be installed, configured and removed remotely for each virtual environment. In order to direct management messages and commands to the appropriate virtual environment, an exemplary embodiment of a virtualization aware device management (VADM) server, described in greater detail below, identifies and keeps track of the different virtual environments on the mobile virtualized device, and interacts with the device management client or clients for those virtual environments. Furthermore, the exemplary VADM server can do so even as the virtual environments executing on a device change during the lifecycle of the device.

Figure 2:
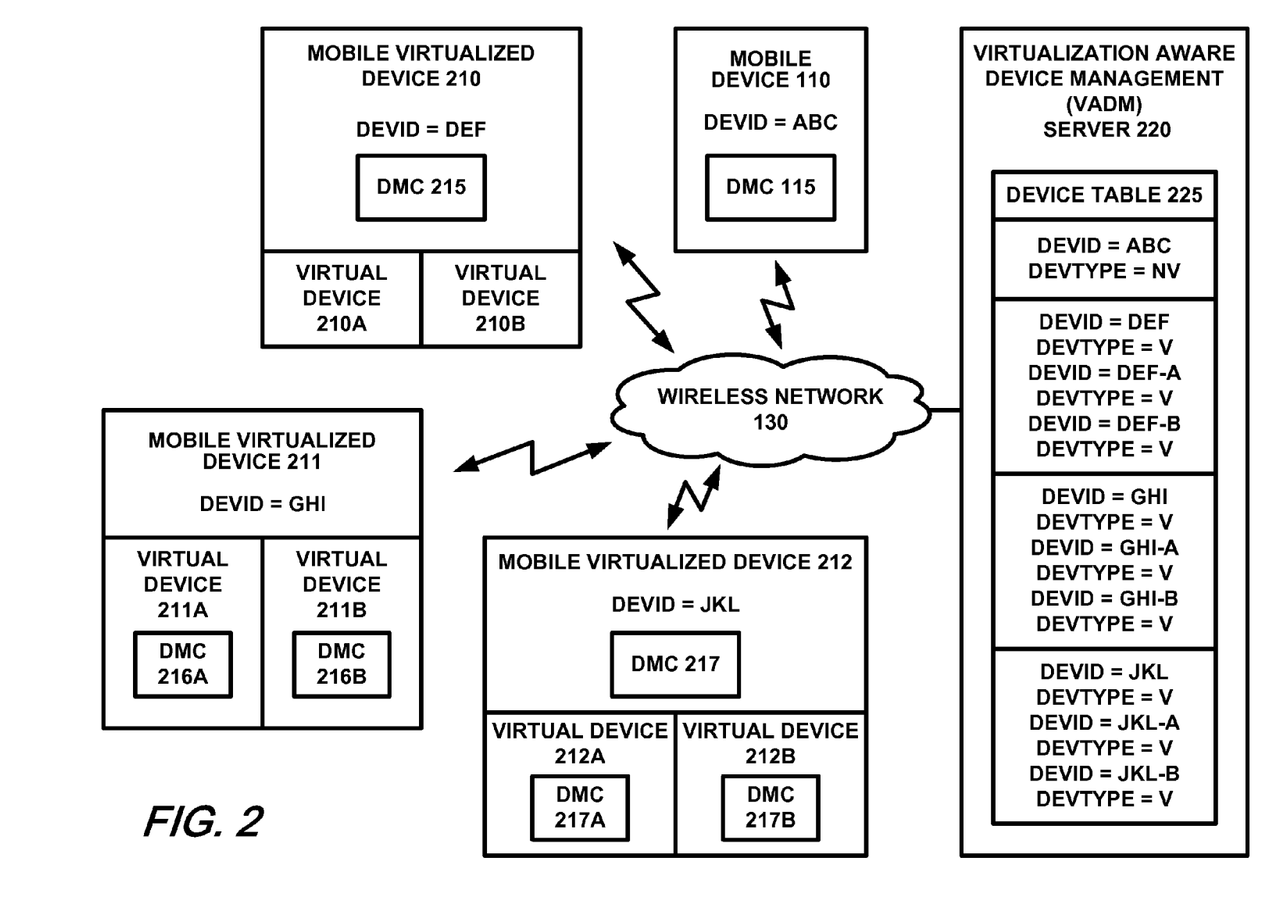
FIG. 2 is a high-level block diagram of a system in which an exemplary virtualization aware device management (VADM) server interacts with a non-virtualized mobile device and mobile virtualized devices.

FIG. 2 is a high-level block diagram of an illustrative system in which an exemplary VADM server 220 interacts with a non-virtualized mobile device 110, a mobile virtualized device 210, a mobile virtualized device 211, and a mobile virtualized device 212 over wireless network 130. VADM server 220 can be implemented using similar or different hardware as that of DM server 120.

Each of mobile devices 110, 210, 211 and 212 is a processor-based device and includes one or more processors and associated memory (not shown). In this context, computer programs in firmware and/or software, are stored in the memory for execution by the one or more processors. The latter is representative of one, or more, stored-program control processors and these do not have to be dedicated to one function, such as the DMC. Rather, the one or more processors may control multiple functions of the mobile device. The associated memory is representative of any suitable data storage device, e.g., random-access memory (RAM), read-only memory (ROM), etc.; may be internal and/or external to the mobile device; and may be volatile and/or non-volatile as necessary. Additionally, each of servers 120 and 220 is a processor-based device and includes one or more processors and associated memory (not shown). In this context, computer programs in firmware and/or software, are stored in the memory for execution by the one or more processors. The latter is representative of one, or more, stored-program control processors and these do not have to be dedicated to one function, such as device management. Rather, the one or more processors may control multiple functions of the server. The associated memory is representative of any suitable data storage device, e.g., random-access memory (RAM), read-only memory (ROM), etc.; may be internal and/or external to the mobile device; and may be volatile and/or non-volatile as necessary.

Each mobile virtualized device 210-212 is a mobile device that implements a mobile virtualized platform. A mobile virtualized platform refers to the hardware device, the monitoring software, and any virtual environments that execute on the monitoring software. The monitoring software can run directly on the hardware or on a host operating system that executes on the underlying hardware.

Unlike mobile devices that support a single operating system, mobile virtualized devices 210-212 are capable of supporting multiple operating systems or virtual environments on the same hardware. A virtual machine monitor (VMM) or hypervisor running on the hardware platform multiplexes the multiple operating systems, thereby creating multiple virtual environments or multiple virtual machines (VMs), also referred to herein as virtual devices. In terms of hardware implementations, non-virtualized mobile device 110 and mobile virtualized devices 210-212 can be similar or different.

In a virtualized device, a device management client can run exclusively within the VMM, for remote management of some or all of the virtual devices in the mobile virtualized device; within each virtual device for remote management of the respective virtual device; or combinations thereof. Typically, the architecture of the mobile virtualized device will determine how device management clients are implemented on the virtualized device.

In the exemplary embodiment of FIG. 2, mobile virtualized device 210 supports two virtual devices, 210A and 210B, with DMC 215 running in the VMM for the remote management of virtual devices 210A and 210B. In such an arrangement, management DMC 215 handles device management communications (e.g., commands, messages, and/or responses) for virtual device 210A, 210B. Management commands from VADM server 220 intended for a target virtual device are executed by DMC 215 in the context of the target virtual device. Additionally, DMC 215 may also handle device management communications relating to the management of the underlying device platform. In an exemplary embodiment, more than one DMC may be provided in the VMM, with one DMC handling device management communications for virtual device 210A, 210B and another DMC handling device management communications for the underlying device platform.

Mobile virtualized device 211 supports virtual devices 211A and 211B, but with respective device management clients (DMC) 216A and 216B for interacting with VADM server 220. In this case, each DMC 216A, 216B handles device management communications for its respective virtual device 211A, 211B.

Mobile virtualized device 212 supports virtual devices 212A and 212B, with a DMC 217 running in the VMM as well as respective DMCs 217A and 217B running in virtual devices 212A and 212B. In this case, DMC 217 handles management communications related to the underlying platform (e.g., such as hardware-related management commands) and acts as a bridge for virtual-device-related management communications (e.g., software installation commands) to and from DMCs 217A and 217B of virtual devices 212A and 212B. Thus, for example, a management command to update a hardware driver for mobile virtualized device 212 would be handled by DMC 217, whereas a management command to install application software for virtual device 212B would be forwarded by DMC 217 to DMC 217B for execution by DMC 217B.

In an exemplary embodiment, VADM Server 220 is capable of bootstrapping the one or more device management clients running on mobile virtualized devices 210-212.

In the exemplary embodiment of FIG. 2, VADM server 220 is preferably capable of managing both virtualized and non-virtualized mobile devices, particularly since a device can be converted multiple times through its life cycle between virtualized and non-virtualized configurations. In doing so, VADM server 220 maintains a representation of each operating environment that it manages, whether the operating environment is a single environment on a non-virtualized device such as device 110 or one of several environments on a virtualized device such as device 210, 211 or 212. Moreover, VADM server 220 is also preferably capable of managing platform-related functions of mobile devices that have been virtualized, in similar manner to non-virtualized mobile devices.

In order to keep track of the devices under its management, VADM server 220 maintains device table 225 which includes information for each device being managed. In addition to a device identifier (DEVID), device table 225 may also include additional information for each managed device, such as whether or not the device is virtualized (DEVTYPE), each device's make and model, as well as information on the software and/or firmware running on each device, such as the device management client(s), among others.

The device identifier (DEVID) for a non-virtualized device can be, for example, the hardware identifier associated with the device. Examples of hardware identifiers include but are not limited to International Mobile Equipment Identity (IMEI), Electronic Serial Number (ESN), Mobile Equipment Identifier (MEID), Globally Unique Identifier (GUID), Serial Number, Stock Keeping Unit (SKU), or any identifier or combination thereof that uniquely identifies a hardware platform. In the illustrative example of FIG. 2, the DEVID of mobile device 110 is "ABC" and its DEVTYPE is "NV", for non-virtualized.

For virtualized devices, such as device 210, 211 or 212, VADM Server 220 distinguishes between the multiple virtual environments installed on the same hardware platform. In this case, there are multiple instances of a device, or virtual devices (or virtual machines), each with its own DEVID derived from the DEVID of the underlying hardware platform. In the illustrative example of FIG. 2, the DEVID of mobile device 211 is "GHI." The DEVID for mobile device 211, which is derived from a unique hardware identifier as described above, will be the same ("GHI") regardless of whether or not device 211 is virtualized. In this case, mobile device 211 has been virtualized, creating virtual devices 211A and 211B, each with its own DEVID, "GHI-A" and "GHI-B", respectively. The DEVIDs of these virtual machines, along with that of the underlying device are maintained in device table 225 of VADM server 220. In the embodiment illustrated, VADM server 220 is capable of remotely managing three different environments for each of mobile virtualized devices 210 and 212: the underlying platform device, and the two virtual devices installed on the device. In addition, the corresponding device types (DEVTYPE) are indicated in this case as virtual or virtualized ("V"). It should be noted that in the case of device 211, for which no DMC is shown in the VMM, VADM server 220 can remotely manage the virtual devices 211A and 211B, but may not be able to remotely manage the underlying platform device. Alternatively, it may be possible for the DMC of one or more of the virtual devices 211A, 211B to be used to manage the underlying platform device, or portions thereof.

In exemplary embodiments, a basic rule for generating the DEVID of a virtual device is to include the globally unique hardware identifier of the underlying platform device together with an extension identifier that is locally unique to the virtual device. This ensures a globally unique identifier for each virtual or non-virtual device managed. The generation of DEVIDs can be carried out by each DMC within the virtual devices or by the DMC within the VMM.

In exemplary embodiments, the VADM server is able to distinguish between non-virtual devices (i.e., mobile devices that have not been virtualized or the underlying platform of a mobile virtualized device) and virtual devices based on their DEVIDs. For example, the DEVID for a virtual device may be formatted as a concatenation of the DEVID of the underlying device that is N1 symbols long (e.g., "XYZ"), and an additional, typically shorter, identifier that is N2 symbols long (e.g., "A"), to distinguish it from other virtual devices on the same underlying device. Thus, when the VADM server encounters a DEVID that is N1+N2 symbols long, the VADM server can infer that the DEVID relates to a virtual device and when it encounters an identifier that is only N1 symbols long, the VADM server can infer that the DEVID relates to a non-virtualized device. In such an embodiment, the VADM server need not separately maintain the aforementioned DEVTYPE information. As can be appreciated, a variety of different functions and/or formats can be used for combining the globally unique hardware identifier of the underlying platform device and the locally unique identifier of a virtual device to generate the DEVID of the virtual device. Moreover, DEVIDs can be formed from a variety of suitable symbols, alphanumeric or otherwise.

The DEVID associated with each device, virtual or non-virtual, can be used by VADM server 220 as an index into a routing table to determine a routing identifier (e.g., MSISDN, MAC, IP address) associated with the device. The type of routing identifier stored in the routing table for a given device indicates the routing mechanism to be employed. Thus, for example, if the routing identifier stored for a device is the MSISDN associated with the device, a management communication to the device can be sent as a Short Message, which is sent via a SMS gateway. As another example, if the routing identifier for a device is an IP address, then the management communication is sent to an IP Push notification gateway. The particular conduit for routing may change, however, based on the preferred wireless network interface, for instance, of the device. Moreover, the routing identifier associated with a device may also change dynamically, as in the case of IP addresses assigned dynamically via DHCP.

In exemplary embodiments, the routing information is included in device table 225, thereby eliminating the need to maintain a separate routing table. During updates of device table 225, however, it is typically advisable to lock device table 225 in order to prevent inconsistencies as the data therein changes. Locking device table 225 would also prevent access to the routing information which may not change as frequently as other data in device table 225 or may change independently of such data. As such, it may be preferable to maintain the device and routing information in separate tables.

Using the routing identifier associated with a device, VADM server 220 can initiate a device management transaction with the device. It is possible for two or more virtual devices on the same virtualized device to be associated with the same routing identifier, or for each virtual device to be associated with a different routing identifier.

Implementations of the present invention allow a mobile virtualized device to be treated as multiple virtual devices. This makes extending the management functionality to mobile virtualized devices scalable as each virtual environment appears as a device. Any management functionality that can be provided for non-virtualized devices—other than management functionality that cannot be carried out by virtual devices, such as hardware configuration commands, or the like—can also be used for virtual devices by directing the management action to the appropriate virtual device.

A non-virtualized mobile device can be turned into a mobile virtualized device such as by changing firmware on the device via a firmware update. Such a firmware update when installed on the device will provide supervisory software, i.e., a hypervisor or VMM that executes on the bare hardware or on existing operating system software, referred to as the host operating system. In either case, multiple virtual environments can be created by installing guest operating systems once the supervisory software capable of virtualizing the device is installed. After virtualization of a mobile device, the DMC(s) for the newly created virtual devices register with the VADM server, as described in greater detail below. Upon registration, the VADM server managing the device creates a new entry in its device table 225 for each new virtual device created, each with its own DEVID (and DEVTYPE="V", if used). As such, each mobile virtualized device, such as devices 210-212, is represented at the VADM server as multiple devices. If a virtual device is uninstalled from a virtualized device, the VADM server removes the uninstalled virtual device's entry from device table 225.

When a DMC registers with VADM server 220, the DMC provides the DEVID of the device or devices associated with the client. The DMC may also provide additional information such as credentials associated with the device, including, for example usernames, passwords, and/or certificates installed on the device. Based on the type of identifier, VADM server 220 determines the type of device and manages it accordingly.

VADM server 220 may or may not be involved in the process of converting a non-virtualized device into a virtualized device, such as by enabling or participating in an over-the-air firmware update. If VADM server 220 is involved, the firmware package that includes the components to support device virtualization can be provided by VADM server 220 or by some other server (not shown).

There may be devices, however, that have already been virtualized before coming under the management of VADM server 220, or that are virtualized by other means in which VADM server 220 is not involved. For instance, a device may be virtualized at the factory, by user programming, or by some third party programming, among other possibilities. Similarly, virtual devices may be installed or uninstalled on a virtualized device without the involvement of the VADM server. In any case, the VADM server needs to know whether a device to be managed is virtualized and to keep track of changes in the device's virtualization status (i.e., whether the device is virtualized and if so, the virtual devices supported thereon).

Figure 3:
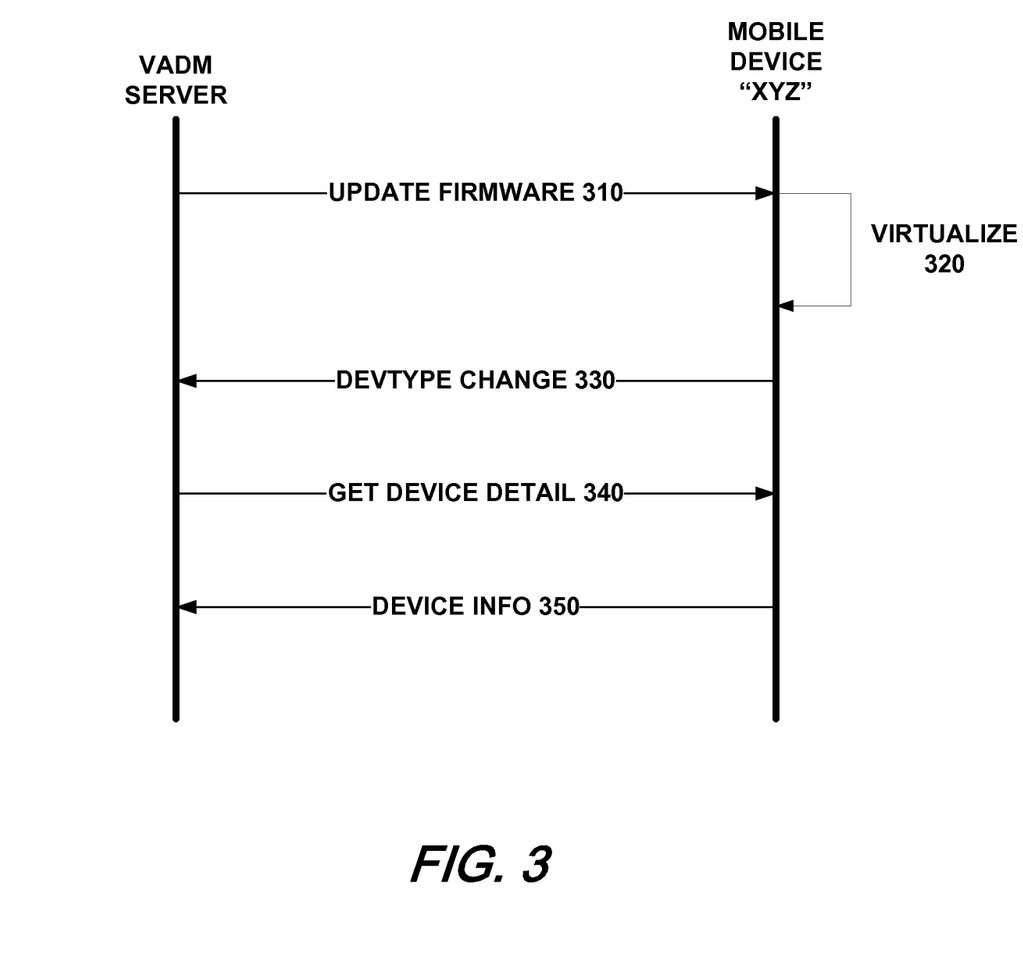
FIG. 3 is a diagram illustrating an exemplary sequence of events by which a VADM server becomes aware of virtual devices installed on a virtualized device.
Figure 4:
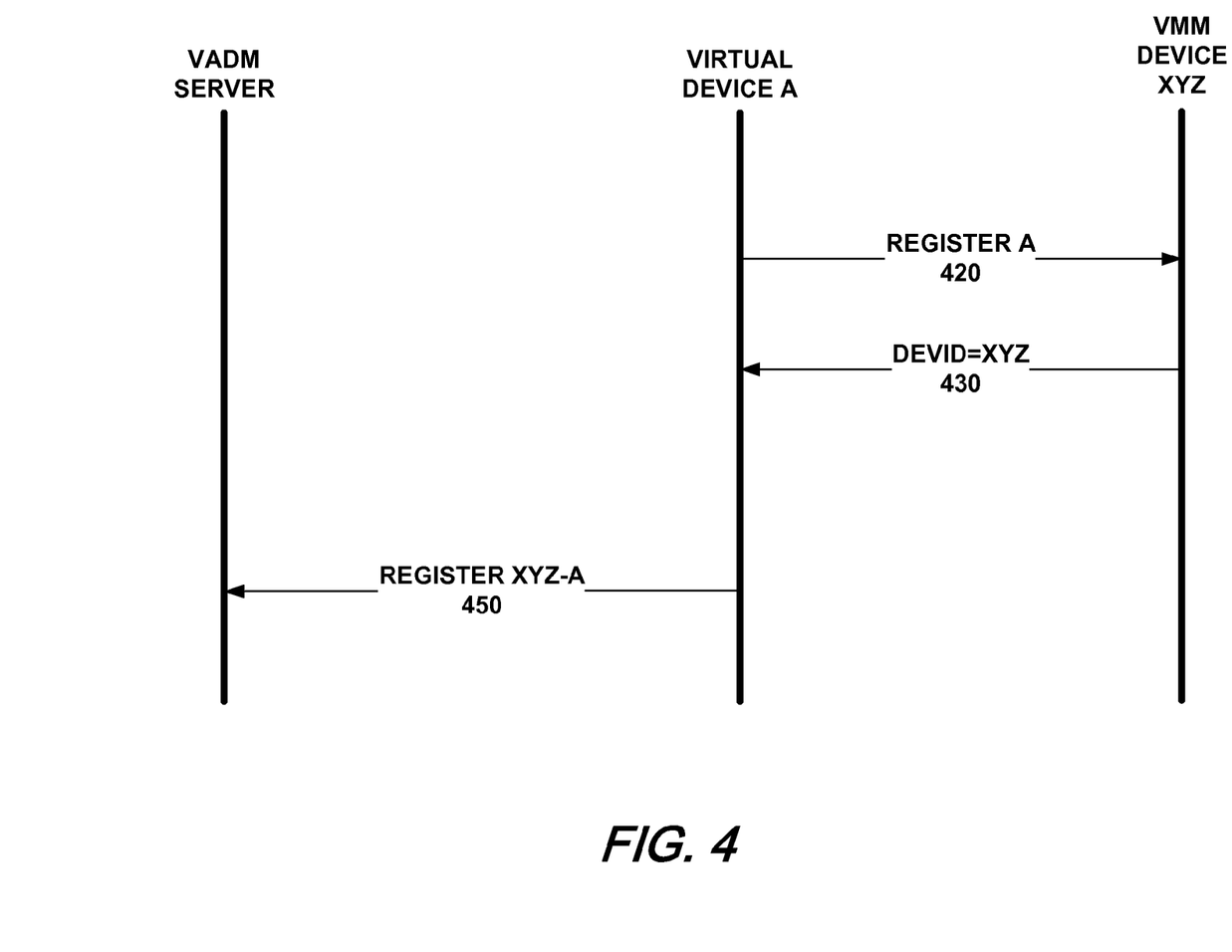
FIG. 4 is a diagram illustrating a further exemplary sequence of events by which a VADM server becomes aware of virtual devices installed on a virtualized device.

How a VADM server becomes aware of the virtualization status of a device will depend on the device management client configuration of the device. As mentioned above, a DMC may be installed and run in the VMM of the virtualized device for management of the multiple virtual machines of the device (e.g., device 210), or each virtual machine may have its own DMC (e.g., device 211). FIG. 3 shows an exemplary sequence of operations by which a VADM server becomes aware of the virtual devices in the first case, while FIG. 4 shows an exemplary sequence of operations by which a VADM server becomes aware of the virtual devices in the second case. For mobile virtualized devices having a DMC in the VMM as well as DMCs in each virtual device (e.g., device 212), either sequence of operations shown in FIGS. 3 and 4 can apply.

As shown in FIG. 3, at some point 320 a non-virtualized mobile device becomes virtualized. In the scenario illustrated, the mobile device becomes virtualized through involvement of a VADM server, although as discussed above, a device can become virtualized by other means as well. As shown, at 310 the mobile device receives a firmware update command from the VADM server. Upon installation of the updated firmware at 320, the mobile device becomes virtualized, thereby creating two or more virtual devices. Additionally, a virtualization-capable DMC is installed on the virtualized device as part of the updated firmware installation. As mentioned, in this case the DMC runs in the VMM.

In an exemplary embodiment, each of the virtual devices installed as part of the firmware update that virtualizes the mobile device and installs the DMC are already registered (or pre-registered) with the DMC. Any virtual devices that are later installed will register with the DMC. Similarly, when a virtual device is uninstalled, it will be de-registered with the DMC. The registration or pre-registration of the virtual devices with the DMC provides the DMC with information for each virtual device including, for example, one or more of: the type of guest operating system of the virtual device; the presence or absence of a separate DMC running within the guest operating system of the virtual device; and/or other book keeping information such as the location of files for the virtual device.

Additionally, once a virtual device has registered with the DMC, the DMC uses the DEVID associated with the underlying mobile device to generate the DEVID of the virtual device, as described above.

At 330, once the device is virtualized and the virtual devices have registered with the DMC in the VMM, the DMC informs the VADM server of the device's new device type—namely, that its DEVTYPE is now virtualized ("V")—by sending a device type change message (DEVTYPE CHANGE) to the VADM server. The DEVTYPE CHANGE message can be, for example, a gratuitous message or an alert that the DMC sends to the VADM server using bootstrap information. The bootstrap information, which is typically stored in a file as part of the installation of the DMC, may include the name (or URL) of the VADM server as well as any security credentials that may be needed to initiate secure transactions between the DMC and the VADM server.

At 340, the VADM server then sends a GET DEVICE DETAIL command to the DMC of the virtualized device. By sending the GET DEVICE DETAIL command, the VADM server queries the DMC for information about the mobile virtualized device. In an exemplary embodiment, the GET DEVICE DETAIL command is as defined in the Open Mobile Alliance DM 1.2 protocol. Preferably, whenever the VADM server sends a communication to the DMC, such as a GET DEVICE DETAIL command, it also sends security credentials to the DMC so that the DMC can confirm the authenticity of the server as part of a mutual authentication arrangement.

In response to the GET DEVICE DETAIL command from the VADM server, the DMC responds at 350 with a device information message containing a list of device identifiers (DEVIDs) associated with the underlying platform device and the virtual devices supported thereon. The DMC may also provide additional information such as the make and model of the underlying platform device, and/or information about software or firmware running on each device, among other possibilities.

After receiving this information, the VADM server can update its device table accordingly. Thus, in the case illustrated in FIG. 3, the VADM server becomes aware of the existence of the virtual devices by receiving a DEVTYPE CHANGE message from the DMC running in the VMM of the mobile virtualized device, and then querying the DMC to obtain information about the virtual devices. By virtue of the device information message received at 350 in response to the query, the VADM server becomes aware of the virtual devices currently installed on the mobile virtualized device. At this point, it can be said that the virtual devices are "registered" with the VADM server. Once a device has registered with the VADM server, the device can be remotely managed by the VADM server.

Similarly, for cases in which virtual devices are added or deleted from an already virtualized mobile device, the DMC sends a change message analogous to that sent at 330 to inform the VADM server that there has been a change. The VADM server can then send a GET DEVICE DETAIL command to determine what changes were made. After receiving the device information from the DMC, the VADM server can update its device table accordingly.

For cases in which a mobile virtualized device becomes non-virtualized, the mobile device sends a DEVTYPE CHANGE message to the VADM server indicating that the device is now non-virtualized ("NV"). After receiving such a message, the VADM server can update its device table accordingly, including deleting the entries for the virtual devices uninstalled from the now non-virtualized mobile device.

Note that while the procedure described with reference to FIG. 3 entails the VADM server sending a GET DEVICE DETAIL command in response to a DEVTYPE CHANGE message from the DMC, the VADM server preferably can send a GET DEVICE DETAIL command to a device at other times as well, without having to first receive a DEVTYPE CHANGE message. For example, a VADM server can send a GET DEVICE DETAIL command periodically, or whenever an update of the device information at the VADM server is needed or deemed appropriate.

FIG. 4 shows an exemplary sequence of operations by which a VADM server becomes aware of virtual devices on a mobile virtualized device by DMCs running within the virtual devices. After a device has been virtualized (with or without VADM server involvement), a DMC is installed in one or more of the virtual devices thus created. Although operation with respect to only one virtual device (A) is shown in FIG. 4 for simplicity, operation with respect to additional virtual devices having their own DMC will be similar. At 420, the DMC of virtual device A registers with the VMM of the mobile virtualized device and requests from the VMM the unique hardware identifier associated with the mobile device. For virtualized devices such as device 212 which also have a DMC in the VMM, the DMCs of the virtual devices register with the DMC in the VMM.

At 430, the VMM provides the DMC of virtual device A with the unique hardware identifier ("XYZ") associated with the mobile device. Using the device identifier, the DMC generates the DEVID ("XYZ-A") associated with virtual device A, and at 450 uses this identifier to register virtual device A with the VADM server. Thus, in an exemplary embodiment, a mobile virtualized device may have multiple virtual devices, one or more of which having a DMC that can register independently with the VADM server as a separate device.

As in the case of any DMC interacting with a DM server, it is contemplated that the various DMCs running on a mobile virtualized device and the VADM server preferably will mutually authenticate each other when interacting, such as in the above-described registration procedure, among other interactions. Moreover, it is contemplated that the various DMCs running on a mobile virtualized device can employ the same or different security credentials. Likewise, it is contemplated that the VADM server will accordingly employ the same or different security credentials when interacting with the various DMCs running on a mobile virtualized device. It is also contemplated that while security credentials based on bootstrap information will typically used for initial interactions, security credentials can change from their initial values.

After a VADM server becomes aware of virtual devices on a mobile virtualized device, it can then interact with the virtual devices to carry out device management transactions. For embodiments in which virtual devices have their own DMC, which directly interact with the VADM server, the VADM server will send management communications directly to each intended target virtual device, and in particular to the DMC of the target virtual device, using the DEVID of the target virtual device. The DMC of the target virtual device will carry out any management commands and interact with the VADM server. For embodiments in which there is a DMC in the VMM serving multiple virtual devices, the VADM server directs management communications to that DMC. Each management communication identifies the intended target virtual device using its DEVID. Preferably, the DMC implementation in a mobile virtualized device is transparent to the VADM server.

Figure 5:
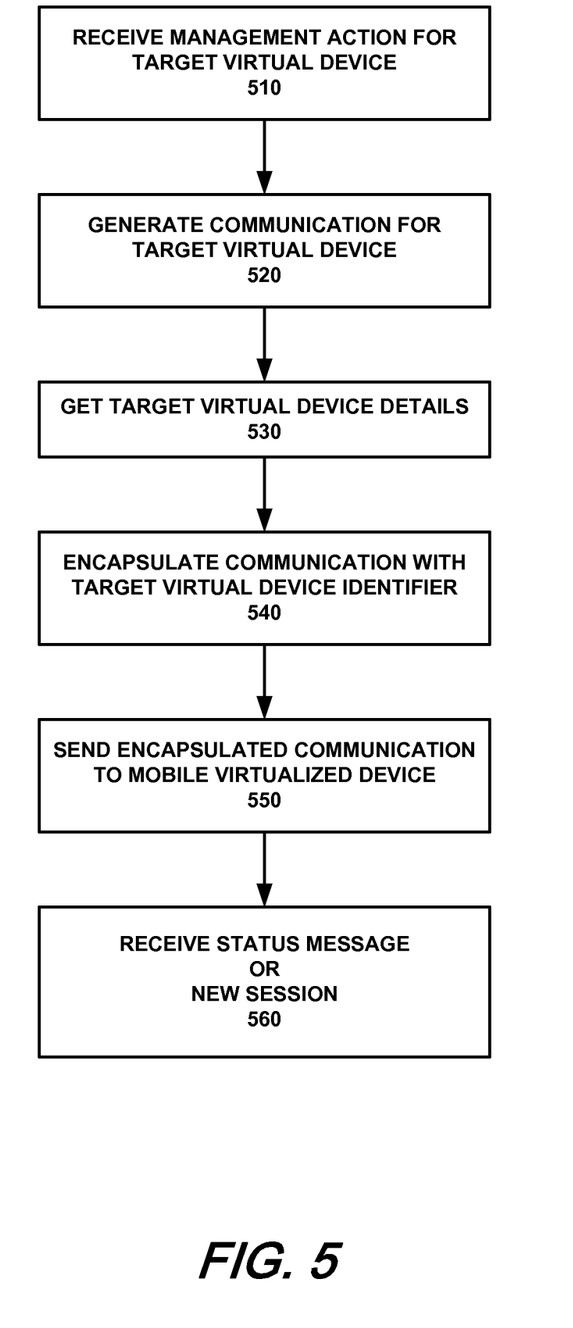
FIG. 5 is a flow chart showing an exemplary interaction between a VADM server and a mobile virtualized device.

FIG. 5 is a flow chart showing an exemplary embodiment of a process performed by a VADM server in sending a communication, such as a management command or notification message, to a mobile virtualized device.

At step 510, the VADM server receives from a higher level management authority, such as from a customer service or account management entity, a desired management action or actions for a target virtual device under the management of the VADM server. The higher level authority may specify actions such as installing application software to be executed by the target virtual device, locking the virtual device, and/or wiping data from the virtual device, among other possibilities. The interaction between the VADM server and the higher level authority can be by any suitable means such as, for example, via an administrative user interface or a programmatic interface that specifies desired actions for targeted devices.

The identity of the target virtual device may be specified by the higher level management authority, or the VADM server can infer its identity from other information provided by the higher level management authority. As an illustrative example, consider a mobile virtualized device with a first virtual device running an operating system supporting use of the device within an enterprise and a second virtual device running another operating system supporting personal use, unrelated to the enterprise. The enterprise virtual device is managed in accordance with actions specified by an enterprise-related authority whereas the personal use virtual device is managed in accordance with actions specified by a different, personal-use-related authority. It is contemplated that the higher level authority requesting a management action will specify the action and the mobile virtualized device of the target virtual device but not necessarily the target virtual device itself. Depending on the source of the request (i.e., the enterprise or personal use authority) the VADM server can determine the appropriate target virtual device and address the management communication(s) accordingly, as described below. It should be noted that the higher level authority may or may not be aware that the target of its requested actions is a virtual device.

The VADM server may also be able to determine the target virtual device based on the type of communication to be sent. For example, an executable file will typically have a file name extension (.exe, .jar, .cab, etc.) and/or metadata that can be used to identify the target execution environment. If a higher authority requests the installation of an application on a device, the VADM server can infer the target virtual device by parsing the extension of the executable file name and/or the file's metadata. For example, applications for Windows and Apple operating systems will have different extensions. If a virtualized device has one virtual environment running a Windows operating system and another running an Apple operating system, the VADM server can identify the target virtual device in accordance with the extension of the application to be installed.

At step 520, in response to the desired management action, the VADM server generates the communication (e.g., management command or notification message) that is to be sent to the mobile virtualized device. For example, carrying out a desired management action such as installing an application, locking a virtual device or wiping data from a virtual device, may entail sending one or more commands from the VADM server to the target virtual device. At step 520, the VADM server generates the set of one or more commands, or a corresponding notification message, to be sent to the target virtual device for carrying out the desired action.

At step 530, the VADM server obtains details pertaining to the target virtual device, including, for example, a routing identifier and/or security credentials associated with the virtual device. As discussed above, the routing identifier is stored in a routing table indexed by the device identifier (DEVID) associated with the target device. For example, if the device can be reached by sending a SMS message, the MSISDN of the device acts as a routing identifier.

At step 540, the VADM server encapsulates the communication to be sent with the identifier of the virtual device. The encapsulated communication contains the identifier (e.g., "XYZ") of the mobile device in an outer header and the local extension identifier (e,g, "A" or "B") of the target virtual device in an inner header.

At step 550, the VADM server sends the communication to the mobile virtualized device using the routing identifier determined in step 530. In the case where the mobile virtualized device has a DMC running in the VMM, the DMC strips the outer header and uses the local extension identifier in the inner header to direct the device management communication to the correct target virtual device. In the case where DMCs execute in each virtual device, the management communication is delivered to the DMC of each virtual device but only the DMC of the virtual device whose identifier matches the identifier in the communication will respond to the communication. The other DMCs can ignore and/or discard the communication.

At step 560, if the communication sent from the VADM server to the virtual device was a management command, the VADM server will receive a status message from the mobile device indicating the result of the execution of the management command. The status message will be generated by the DMC in the VMM or the DMC of the target virtual device. If the communication from the VADM server to the virtual device was a notification message, the applicable DMC will initiate a new management transaction with the VADM server in order to obtain from the server any management commands queued for the target virtual device.

In view of the above, the foregoing merely illustrates the principles of the invention and it will thus be appreciated that those skilled in the art will be able to devise numerous alternative arrangements which, although not explicitly described herein, embody the principles of the invention and are within its spirit and scope. It is therefore to be understood that numerous modifications may be made to the illustrative embodiments and that other arrangements may be devised without departing from the spirit and scope of the present invention as defined by the appended claims.

What is claimed is:

1. A method for remote management of a mobile virtualized device comprising:

representing each of a plurality of virtual devices installed on the mobile virtualized device by a device identifier, each virtual device being associated with a respective virtual environment;

encoding at a device management server a device management communication for one of the plurality of virtual devices with the device identifier of the virtual device; and sending the device management communication from the device management server to a dedicated device management client executing within the respective virtual environment associated with the virtual device represented by the device identifier with which the device management communication is encoded.

2. The method of claim 1 comprising determining at the device management server a routing identifier associated with the mobile virtualized device, wherein the device management communication is sent from the device management server to the mobile virtualized device in accordance with the routing identifier.

3. The method of claim 1 comprising registering each of the plurality of virtual devices at the device management server.

4. The method of claim 3 comprising maintaining a device table at the device management server, wherein the device table contains an entry for each of the plurality of virtual devices.

5. The method of claim 4 comprising:

querying the mobile virtualized device for device information;

receiving the device information at the device management server, wherein the device information includes information about the plurality of virtual devices; and updating the device table in accordance with the device information.

6. The method of claim 5 comprising:

receiving a device change message at the device management server from the mobile virtualized device before querying the mobile virtualized device.

7. The method of claim 6, wherein receiving the device change message is preceded by a firmware update on the mobile virtualized device.

8. The method of claim 6, wherein receiving the device change message is preceded by installing or uninstalling a virtual device on the mobile virtualized device.

9. The method of claim 1 comprising classifying managed mobile devices as being virtualized or non-virtualized.

10. The method of claim 1, wherein an another device management client executes in a virtual machine monitor of the mobile virtualized device.

11. The method of claim 1, wherein a respective device management client executes within each of the plurality of virtual devices.

12. The method of claim 1, wherein the device identifier is a function of a unique identifier associated with the mobile virtualized device and an another identifier that is locally unique within the mobile virtualized device.

13. The method of claim 12, wherein the device identifier is generated by the device management client.

14. The method of claim 10, wherein the device identifier is a function of a unique identifier associated with the mobile virtualized device and an another identifier that is locally unique within the mobile virtualized device and wherein the device identifier is generated by the further device management client.

15. The method of claim 12, wherein the unique identifier associated with the mobile virtualized device includes at least one of an International Mobile Equipment Identity (IMEI), Electronic Serial Number (ESN), Mobile Equipment Identifier (MEID), Globally Unique Identifier (GUID), Serial Number, Stock Keeping Unit (SKU), Mobile Subscriber Integrated Services Digital Network (MSISDN) number, Media Access Control (MAC) address, and Internet Protocol (IP) address.

* * * * *